(12) United States Patent
Andrade et al.

(10) Patent No.: US 11,352,550 B2
(45) Date of Patent: Jun. 7, 2022

(54) METHOD FOR PARAFFIN INHIBITING

(71) Applicant: Plus5, Inc., Windermere, FL (US)

(72) Inventors: Paul Andrade, Windermere, FL (US); Roger Anton Sramek, Mill Valley, CA (US)

(73) Assignee: Plus5, Inc., Windermere, FL (US)

( * ) Notice: Subject to any disclaimer, the term of this patent is extended or adjusted under 35 U.S.C. 154(b) by 0 days.

(21) Appl. No.: 16/418,655

(22) Filed: May 21, 2019

(65) Prior Publication Data

US 2020/0369948 A1 Nov. 26, 2020

(51) Int. Cl.
| | |
|---|---|
| *C09K 8/592* | (2006.01) |
| *E21B 43/16* | (2006.01) |
| *E21B 37/06* | (2006.01) |
| *C10B 53/07* | (2006.01) |
| *C10G 1/10* | (2006.01) |
| *C09K 8/594* | (2006.01) |

(52) U.S. Cl.
CPC .............. *C09K 8/592* (2013.01); *C09K 8/594* (2013.01); *C10B 53/07* (2013.01); *C10G 1/10* (2013.01); *E21B 37/06* (2013.01); *E21B 43/16* (2013.01)

(58) Field of Classification Search
CPC ......... E21B 37/06; E21B 43/16; C10B 53/07; C10G 1/10
See application file for complete search history.

(56) References Cited

U.S. PATENT DOCUMENTS

| | | | | |
|---|---|---|---|---|
| 4,983,278 | A * | 1/1991 | Cha | .......................... C10B 47/44 208/407 |
| 2008/0017496 | A1* | 1/2008 | Thompson | .................. C10J 3/66 201/25 |

* cited by examiner

*Primary Examiner* — Zakiya W Bates
(74) *Attorney, Agent, or Firm* — Thomas M. Freiburger

(57) ABSTRACT

A method of enhanced oil recovery for a crude oil production well includes the steps of pyrolyzing rubber materials including the steps of heating the rubber materials to form pyro-vapors, condensing the pyro-vapors to form pyro-gas and pyro-oil where the pyro-oil includes an inhibitor solution including non-polar hydrocarbons and polar hydrocarbons. The inhibitor solution is injected as an injection stream into the crude oil production well to facilitate production of crude oil from the crude oil production well.

10 Claims, 6 Drawing Sheets

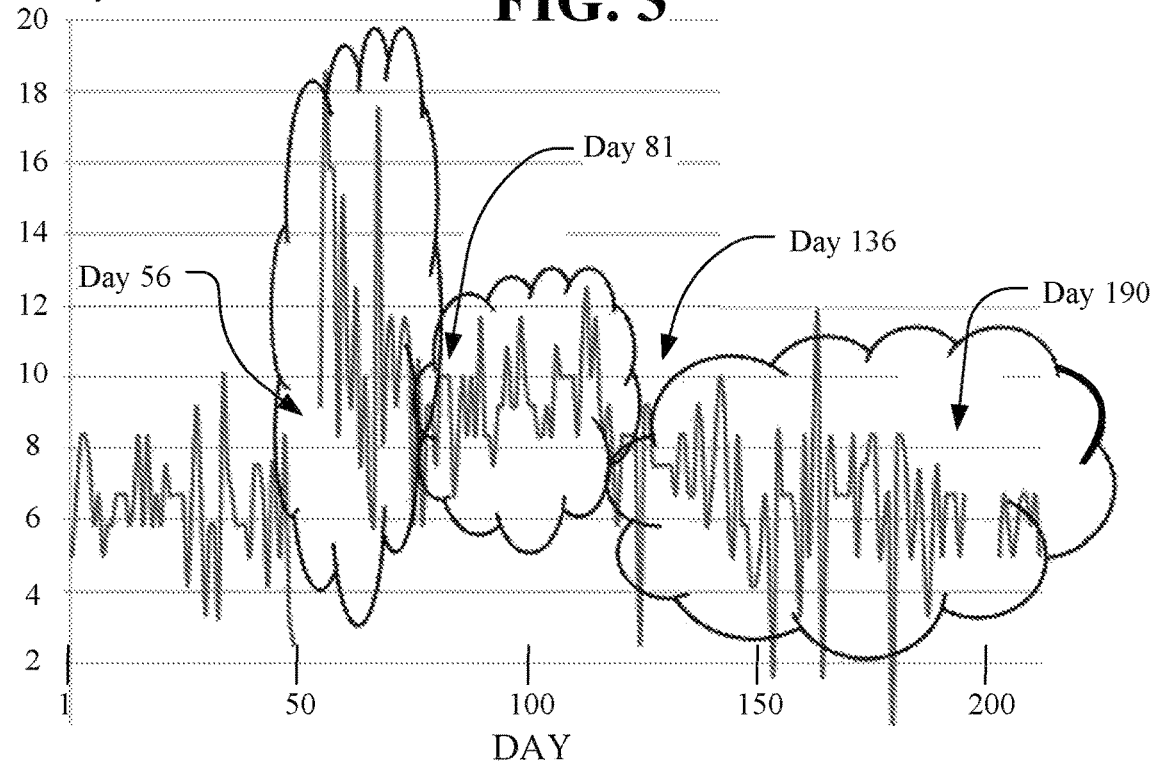
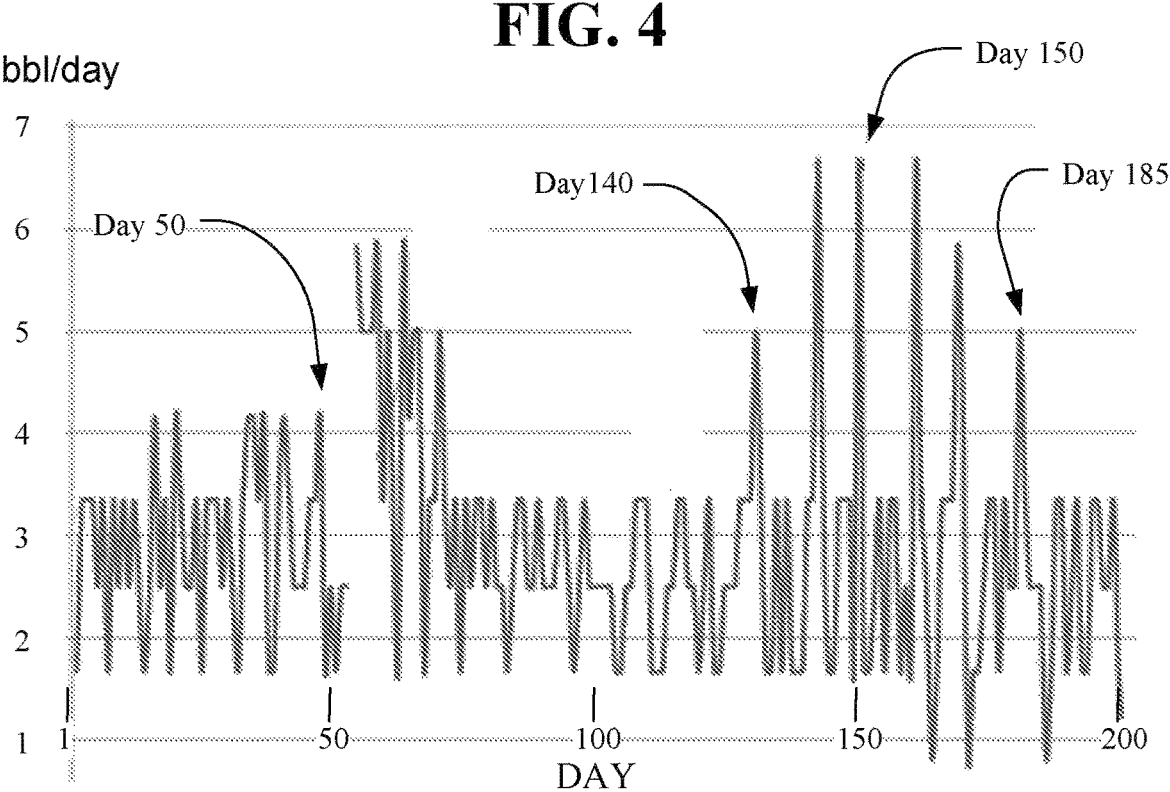

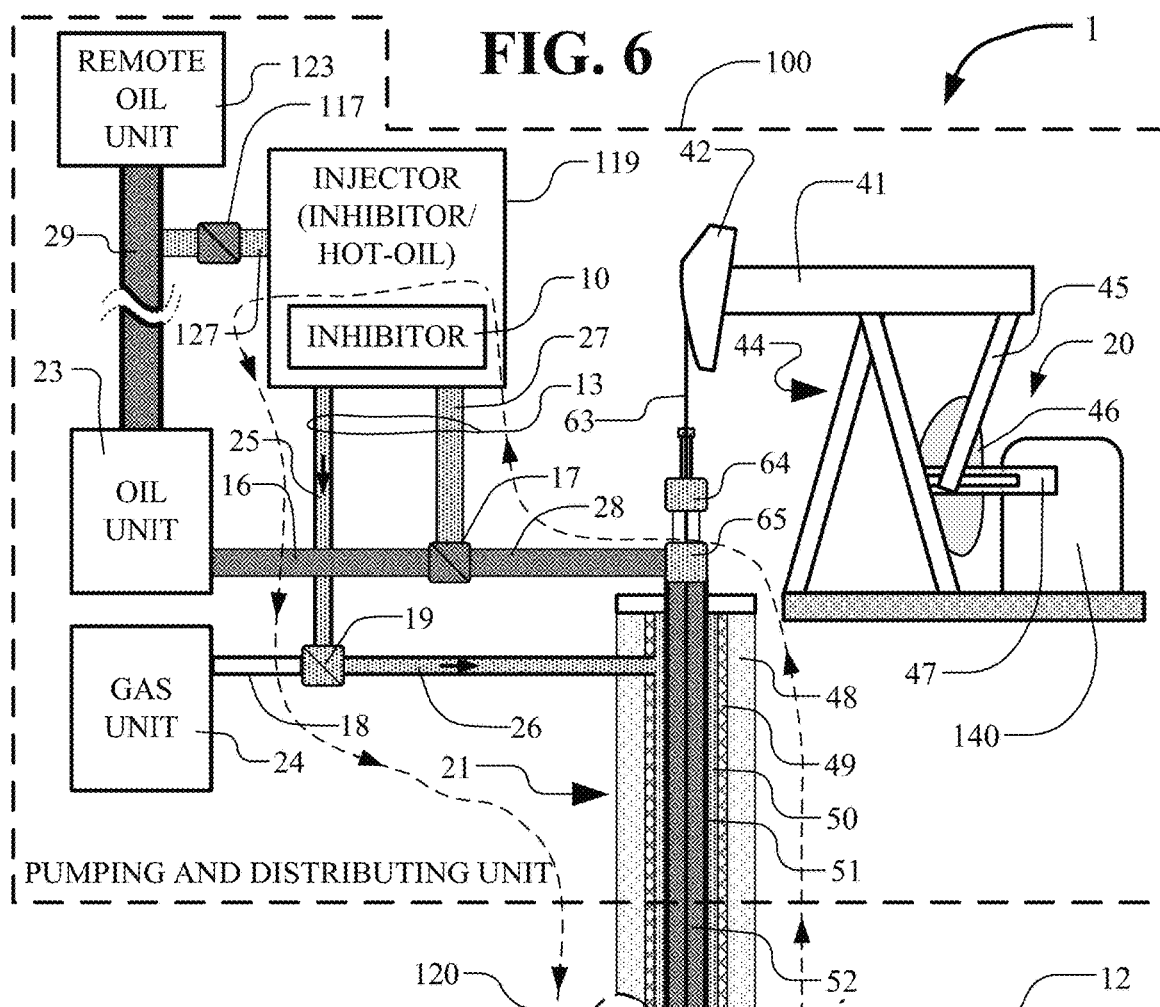
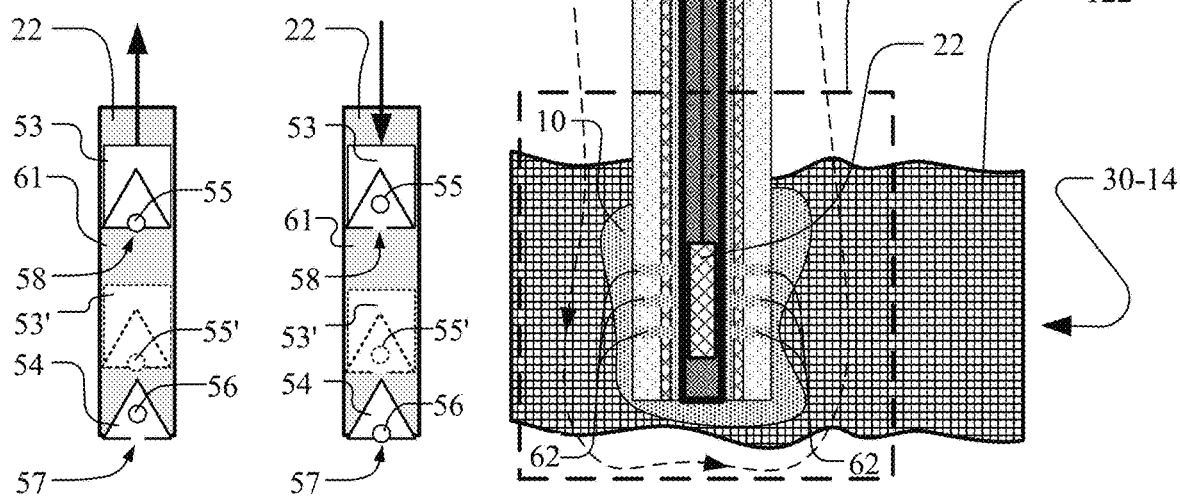

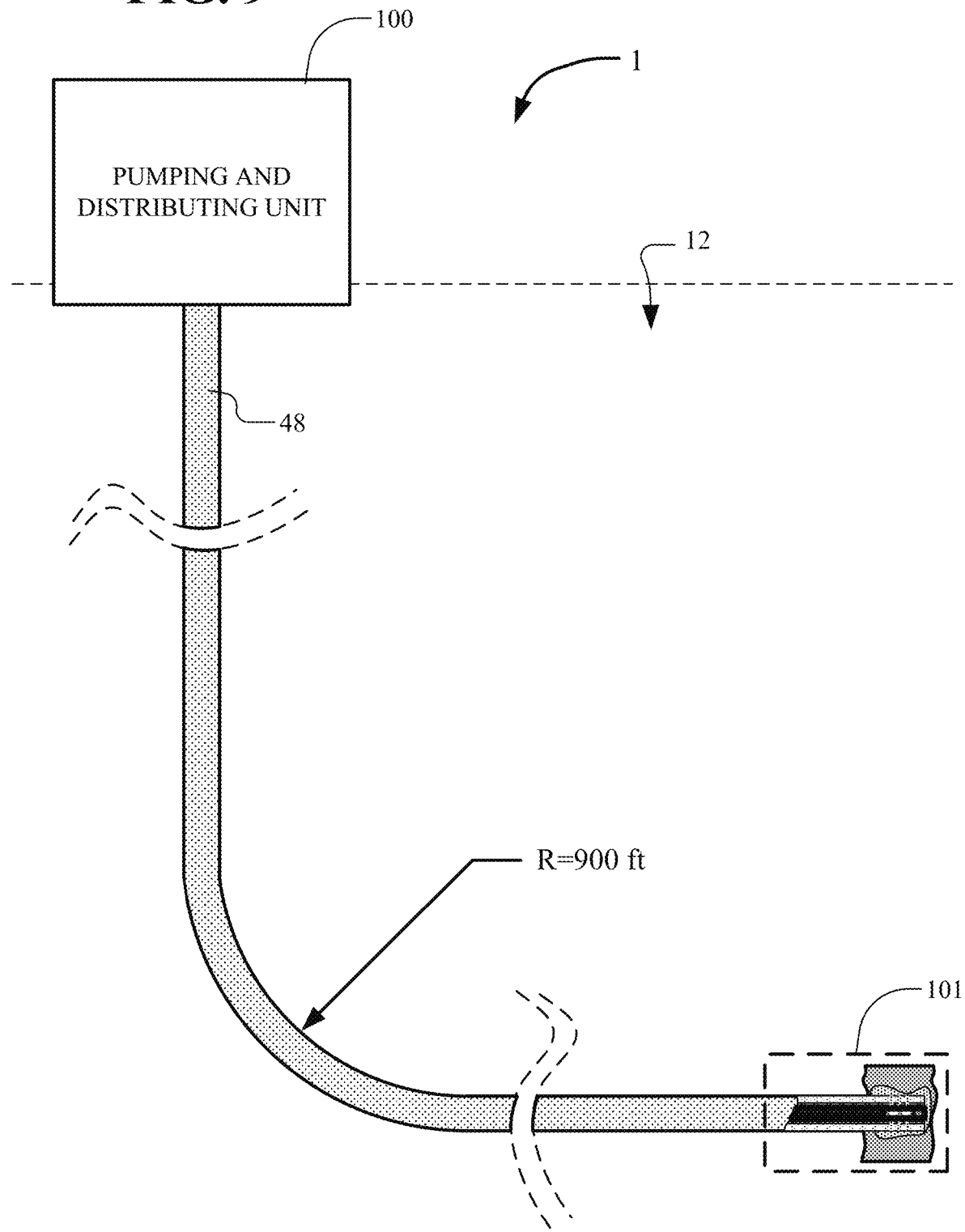

METHOD FOR PARAFFIN INHIBITING

BACKGROUND OF THE INVENTION

The present invention relates to paraffin and asphaltenes inhibitors for modifying the behavior of hydrocarbon fluids such as crude oil.

Fluids produced from oil wells primarily include crude oil and water and are referred to as formation fluids. Formation fluids may also contain natural gas, natural gas condensate, carbon dioxide ($CO_2$) and insoluble clay and silica particles. The formation fluids may contain components that can precipitate and impede the production of oil and gas. These components include paraffin and asphaltenes from crude oils and gas condensates. Paraffin is a hydrocarbon compound that can precipitate or deposit on production components as a result of the changing temperatures and pressures within the production system. Paraffin may precipitate and deposit as waxy substances that may build up, and if severe, may restrict production and can also gel crude oil. Asphaltenes are organic materials consisting of aromatic and naphthenic ring compounds that may contain nitrogen, sulfur and oxygen molecules. The asphaltenes portion of crude oil is an organic part of the oil that is not soluble in straight-chain solvents such as n-pentane or n-heptane.

Crude oils and distillates obtained by distillation of crude oils contain varying amounts of paraffin, which can form precipitates. In the case of crude oil, the paraffin in usually liquefied and stabilized in the crude oil under high temperatures encountered at the downhole. However, as the oil is brought to the surface its temperature is reduced. As a result, the paraffin may begin to precipitate out and may form deposits on any cooler surface with which they come into contact. These wax deposits can cause problems, such as blockage of pipelines, valves and other process equipment. The wax may also deposit in pipelines subsequently used to transport crude oil or fractions thereof including hydrocarbon lines or multiphase transportation lines with oil, gas and/or water. The contents of the transport pipelines are often cooler than the contents of lines on oil platforms or in refineries.

In the field of oil and gas production, the undesirable effects of paraffin and asphaltenes are mitigated to aid oil and gas production. To that end, many chemical additives, which include paraffin inhibitors, asphaltenes inhibitors and the like, are often injected into wells or through flowlines to treat the formation fluids to prevent or control the effects of precipitation of paraffin and asphaltenes. Some well-known paraffin inhibitor products provide mixtures with less than 1%, with some as low as 0.07%, of inhibitors, for effective paraffin and asphaltenes applications.

Paraffin waxes produced from crude oil fall primarily in two categories, macrocrystalline and microcrystalline. The macrocrystalline waxes include primarily long chain, saturated hydrocarbons with carbon chain lengths of C37 to C75+, having individual melting points from 40 to 70° C. The macrocrystalline waxes lead to paraffin problems in production, storage and transport operations. The microcrystalline waxes include naphthenic hydrocarbons with carbon chain lengths of C18 to C36. The microcrystalline waxes contribute the most to tank-bottom sludge where oils have a greater chance of sitting in one place.

A "clean waxy crude" is defined as a crude oil that consists of only hydrocarbons and wax as the heavy organic constituents. "Regular waxy crudes" contain other heavy organics in addition to the waxes (e.g., asphaltenes and resins). These heavy organics have interactions with the crude, which can either prevent wax-crystal formation or enhance it.

As the temperature of the crude oil drops below a critical level and/or as the low-molecular-weight hydrocarbons vaporize, the dissolved waxes begin to form insoluble crystals. This deposition process involves two distinct stages: nucleation and growth. Nucleation is the forming of paraffin clusters that are stable in the hydrocarbon fluid. This insoluble wax itself tends to disperse in the crude. Prior to solidification, the solid wax crystals in the liquid oil change the flow properties from a low viscosity fluid to a very-complex-flow behavior gel, a higher viscosity.

High-molecular-weight waxes, the heavy ones, tend to deposit in the higher-temperature sections of a well, while lower-molecular-weight waxes tend to deposit in lower-temperature regions. Typically the temperature raises 1 degree F. above the mean temperature of the soil at ground level for every 100' below-ground level.

Recovery of hydrocarbons from oil reservoirs is commonly recognized to occur in three recovery stages, namely "primary recovery", "secondary recovery" and "tertiary recovery". In primary recovery, oil is extracted by its natural flow from a well as a result of its own pore pressure inside the well. In secondary recovery, the pressure inside the well drops to levels that make primary recovery no longer viable. To aid the flow in secondary recovery, an external fluid such as water or gas is injected into the reservoir through injection wells located in rock that has fluid communication with production wells in order to apply the needed pressure to force oil up the well bore. In tertiary recovery (Enhanced Oil Recovery or EOR), various methods are applied to increase the flow of crude oil from reservoirs by increasing the primary reservoir drive. These methods include pressure maintenance, injection of displacing fluids, thermal techniques and others. The Enhanced Oil Recovery method is needed in a high percentage of wells in the United States.

The primary parameter to establish for recovery of hydrocarbons from oil reservoirs is the critical temperature at which wax nuclei form in the crude oil. The critical temperature is referred to as the "Wax Appearance Temperature" (WAT) which is also often referred to as the 'Cloud Point'. The WAT is highly specific to each crude. The conditions within the well that can vary are oil composition, cooling rate during measurement, pressure, paraffin concentration, molecular mass of paraffin molecules, occurrence of nucleating materials such as asphaltenes, formation fines, and corrosion products and water/oil ratio.

Prevention of wax formation is often more cost effective than removal of wax deposits that impact the oil flow. One key to wax-deposition prevention is heat. Although electric heaters can be employed to raise the crude oil temperature and improve its flow rate as it enters the wellbore, the costs of a heating system and the access to electrical power are often prohibitive.

A key to improving yields is flow rates. A high flow rate tends to minimize wax adherence to metal surfaces because of the shearing action of the flowing fluid. Additionally, continued flow is more advantageous than a start-stop activity level that allows time for the oil and its waxy components to adhere to the flow substrate, pipes and pumps. Insulated pipelines are also an alternative to minimize, if not eliminate, the problem, but again the cost can be prohibitive for long pipelines.

Some wax deposition can be prevented, delayed, or minimized by the use of dispersants or crystal modifiers. As with asphaltenes, paraffin-wax characteristics vary from well to well. Chemicals that have been effective in one system are not always successful in others, even for wells within the same reservoir. For this reason, it is desirable to establish a good correlation between oil composition and paraffin inhibitor's efficiency avoiding the need for expensive and inefficient 'trial-and-error' procedures."

Crystal Modifiers. Paraffin-crystal modifiers are chemicals that interact with the growing crude-oil waxes by co-crystallizing with the native paraffin waxes in the crude oil that is being treated. These interactions result in the deformation of the crystal morphology of the crude-oil wax. Once deformed, these crystals cannot undergo the normal series of aggregation steps because of their general hardness with a greater inability to break down. Types of paraffin-crystal modifiers include maleic acid esters, polymeric acrylate and methacrylate esters, and thylene vinyl acetate polymers and copolymers.

Dispersants. Many oilfield operators want the wax formation process to be avoided and resort to dispersants. Dispersants act to keep the wax nuclei from agglomerating. Dispersants are generally surfactants, they lower the surface tension of two fluids. When water is used to aid in lifting oil within a well, dispersants also keep the pipe surface water wet, minimizing the tendency of the wax to adhere. Some water production is natural and is removed before crude oil can be shipped. As with many scale prevention methods associated with the use of water, a smooth surface tends to decrease wax adherence. However, the operational problem is to maintain such a surface for an extended period of time while fighting corrosion issues.

Inhibitors. Paraffin Inhibitors prevent further buildup of the viscous paraffin wax from agglomerating equipment. Some crude oils with high levels of paraffin are so viscous that travel in pipelines, particularly during the winter months, is almost impossible. Crystallization of this material can buildup in a production string to the point that it can kill a well. To alleviate this condition, low levels of paraffin inhibitors (400 ppm to 1000 ppm) are continuously injected to prevent this sticky material from adhering to production lines. A line treated with a Paraffin Inhibitor forms a protective layer between the sticky paraffin wax and the outer metal lining. This action inhibits the paraffin from physically attaching to the line and maintains free flowing production. Obviously, these inhibitors must be delivered into the crude oil at temperatures above the WAT.

More About Paraffin and Asphaltenes. Paraffin wax is a white or colorless soft solid derivable from petroleum, coal or oil shale that consists of a mixture of hydrocarbon molecules containing between twenty and forty carbon atoms. Paraffin wax is mostly found as a white, odorless, tasteless, waxy solid, with a typical melting point between about 46 and 68° C. (115 and 154° F.) and a density of around 900 kg/m$^3$. It is insoluble in water, but soluble in ether, benzene, and certain esters. Paraffin is unaffected by most common chemical reagents and can be dissolved by non-polar organic solvents. The general chemical formula for paraffin wax is $C_nH_{2n+2}$, where "n" has an average value between 20 and 30. Paraffin wax is a type of hydrocarbon known as an "alkane." Alkanes are saturated hydrocarbons containing a carbon chain, with each carbon atom bonded to hydrogen atoms. Shorter carbon chains form compounds that are liquid at room temperature, while longer chains produce compounds that are in the solid state. An alkane, is an acyclic saturated hydrocarbon. In other words, an alkane consists of hydrogen and carbon atoms arranged in a tree structure in which all the carbon-carbon bonds are single. Alkanes have the general chemical formula $C_nH_{2n+2}$.

Asphaltenes are molecular substances that are found in crude oil, along with resins, aromatic hydrocarbons, and saturates. Asphaltenes in the form of asphalt or bitumen products from oil refineries are used as paving materials on roads, shingles for roofs, and waterproof coatings on building foundations. Asphaltenes consist primarily of carbon, hydrogen, nitrogen, oxygen, and sulfur. These applications are possible because of the thickening properties associated with asphaltenes that consequently make pumping from an oil well very difficult.

API Density is quite often referred to when talking about asphaltenes. The American Petroleum Institute gravity, or API gravity, is a measure of how heavy or light a petroleum liquid is compared to water. If its API gravity is greater than 10, it is lighter and floats on water; if less than 10, it is heavier and sinks.

Polar and Non-Polar Substances and Solvents. A compound is composed of one or more chemical bonds between different atoms. The polarity of each bond within the compound determines the overall polarity of the compound, how polar or non-polar it is. Solvents can be broadly classified into two categories, polar and non-polar. The polarity, dipole moment, polarizability and hydrogen bonding of a solvent determines what type of compounds it is able to dissolve and with what other solvents or liquid compounds it is miscible. As a rule of thumb, polar solvents dissolve polar compounds best and non-polar solvents dissolve non-polar compounds best, "like dissolves like". Paraffin wax is a non-polar substance, therefore Paraffin wax requires non-polar solvents to break it down effectively.

In consideration of the above background, there is a need for improved paraffin and asphaltenes inhibitors for use in tertiary recovery methods.

SUMMARY

The present invention is method of enhanced oil recovery for a crude oil production well. The method includes the steps of pyrolyzing rubber materials including the steps of heating the rubber materials to form pyro-vapors, condensing the pyro-vapors to form pyro-gas and pyro-oil where the pyro-oil includes an inhibitor solution including non-polar hydrocarbons and polar hydrocarbons. The inhibitor solution is injected as an injection stream into the crude oil production well to facilitate production of crude oil from the crude oil production well.

In an embodiment of the present invention, the crude oil production well has an injector, piping, a core including an annulus, a pump and lift tubing where the core extends into a well bore to a crude oil reservoir where the crude oil has a viscosity increased by paraffin components. The pyrolysis includes the steps of heating scrap tires in a temperature range from 400° C. to 850° C. over a period from 3 hours to 5 hours to form pyro-vapors, condensing the pyro-vapors to form pyro-gas and pyro-oil where the pyro-oil includes an inhibitor solution formed of non-polar hydrocarbons and polar hydrocarbons. The inhibitor solution is mixed with the crude oil from the production well in a percentage greater than 0.15% to form an injection stream for lowering the Cloud Point temperature of the crude oil of the production well.

In an embodiment, the injection stream is injected into a loop including the injector, the piping, the annulus, the pump and the lift tubing. The injection stream provides a continuous flushing of the injection stream in the loop for solubilizing the paraffin to decrease the viscosity of the crude oil.

In an embodiment, the injection stream propagates from the core into the crude oil reservoir.

The foregoing and other objects, features and advantages of the invention will be apparent from the following detailed description in conjunction with the drawings.

BRIEF DESCRIPTION OF THE DRAWINGS

FIG. 3 depicts a chart showing the production rate of a well with hot-oil treatment and insertion of an inhibitor solution.

FIG. 4 depicts a chart showing the production rate of a well with hot-oil treatment and insertion of an inhibitor solution followed by maintenance quantities of the inhibitor solution.

FIG. 6 depicts further details of the pumping and distribution unit with connection to the below-ground pump.

FIG. 7 depicts a portion the pump in the up stroke position.

FIG. 8 depicts a portion the pump in the down stroke position.

FIG. 9 depicts further details of the pumping and distribution unit connected to the below-ground pump having a bend for horizontal extension.

DETAILED DESCRIPTION

Figure 1:
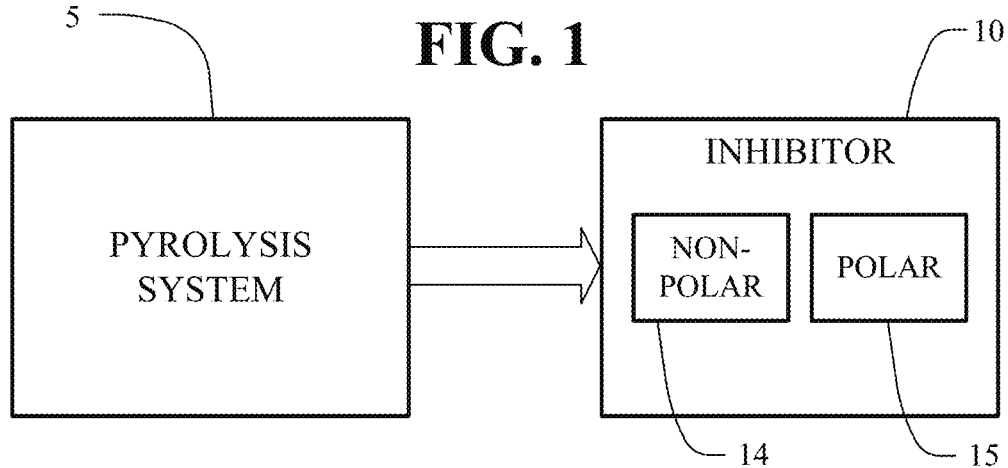
FIG. 1 depicts a block diagram of a pyrolysis system producing an inhibitor.

In FIG. 1, a pyrolysis system 5 operates to produce an inhibitor 10. The inhibitor 10 includes non-polar components 14 and polar components 15. The pyrolysis system 5 pyrolyizes waste tires to form the inhibitor 10. Tire pyrolysis involves the thermal degradation of the tires in the absence of oxygen. Tire pyrolysis is used to convert tires into pyro-materials including pyrolysis gases (pyro-gases), pyrolysis oils (pyro-oils), and pyrolysis solids (pyro-chars) and steel.

In pyrolysis system 5, waste tires are loaded for pyrolysis processing and pyro-solids are unloaded after pyrolysis processing. The pyro-gases and pyro-oils are extracted during the pyrolysis processing.

The pyrolysis processing occurs as follows. Typically, the waste tires are bailed and loaded into a furnace during a LOAD period. After the tires are loaded, a furnace door is closed and the furnace chamber becomes a sealed retort. Next, nitrogen gas is injected into the furnace to purge the chamber and force oxygen out. A heat unit provides heat to the chamber and the temperature begins to rise during an INCREASE period. Initially, the temperature is at room temperature. Heating over the INCREASE period causes the temperature to rise up to Tmax. The temperature is maintained at about Tmax during the STEADY period. Thereafter the heat is turned off. A DECEASE period allows cooling to occur. The cooling can be accelerated by introducing cooling nitrogen into the furnace until the furnace approaches Tmin.

The pyro-solids are unloaded during the UNLOAD period. Air is not introduced into the furnace while the temperature of any of the pyro-solids are over approximately 300 degrees F., otherwise the carbon can catch fire/oxidize when contact with oxygen is made.

The pyrolysis processing is effective to drive off the pyro-gases and pyro-oils. The pyro-gases and pyro-oils are extracted from the furnace during the INCREASE, STEADY and DECREASE periods.

The products of the pyrolysis process include carbon, petroleum, gas, steel and the possibility to burn the gas to generate electrical power. The petroleum product is of interest in connection with inhibitor solutions for paraffin and asphaltenes. The petroleum product is created by condensing the pyro-gas that is generated during the pyrolysis heating cycle (INCREASE, STEADY, DECREASE). The gas created in the sealed furnace is changed through differing applications of heat temperatures and durations to drive off more light or heavy ends of carbon string compounds, thus providing an ability to create variations of paraffin inhibitor strengths. The condensing system consists of multi-staged cooling chambers that produce, among other things, the petroleum products. The condensing process breaks out three groups of carbon string compounds. First, the C1-C2 non-condensable gas at room temperature is produced. Next, the C3-C9 light condensable are produced. Following, the medium condensable C10 to C17 are produced. Finally, the heavies that include C18-C26 are produced. The heavies condense out first with the lights condensing at the end of the condensing process.

The dispersant product, inhibitor solution, selected from the condensing includes a blend of aromatic, aliphatic and naphthenic liquid organic hydrocarbons. The inhibitor solution is used for increasing crude oil production rates, decreasing lift costs and otherwise reducing the adverse effects of paraffin and asphaltenes in oil wells and related equipment. This inhibitor solution breaks down paraffin and asphaltenes, lowers the cloud point in the oil bearing zone and reduces paraffin buildup in the oil bearing zone, in down-hole components and in other equipment. The inhibitor solution is added to hot oiling to speed up the paraffin break down process. Continued use of the inhibitor solution after hot oiling processing stabilizes production flow. The inhibitor solution is used for initial clearing and then on a continuous basis in a 'maintenance mode.

The properties of the inhibitor solution are Specific Gravity (60° F.): 0.82, Weight (60° F.): 6.8 lbs/US gal, Flash Point (SFCC): 74° F., Pour Point (ASTM D-97): <−40° F., Viscosity (ASTM D-455) (60° F.): 32, Solubility: Oil-soluble, Ionic Character: Anionic, pH: 7.5.

It has been found that pyrolysis processing produces an inhibitor solution with non-polar components and polar components that are effective for paraffin and asphaltenes control. Other components that are not specifically characterized as "polar" and/or "non-polar" can include "Azeotropic", "Polyaromatic Hydrocarbons (PAH's such as "Chrysene, Anthracene, Naphthalene"), "Ash" (the residual on incineration containing inorganic, oxides of metals, salts, and native metal species), "Alkanes" and "Alkenes" (linear carbon chain structures without polarity) and other substances that are not important to paraffin and asphaltenes control.

The composition of the inhibitor solution is determined with laboratory gas chromatography-mass spectrometry (GC-MS) testing. The non-polar components in the inhibitor 10 are potent for paraffin and asphaltenes control. Polar components in the inhibitor 10 do not provide a direct contribution towards paraffin and asphaltenes control. However, the polar components play a role as carriers for dispersing the non-polar components.

The inhibitor solution included 1.31% Polar, 5.30% Non-Polar, 2.58% Mostly Non-polar, 4.03% Both Polar and Non-Polar. The analysis in the example was done using a Sample Size equal to 5325000 ng/ml.

In general, to achieve a solution effective in controlling paraffin and asphaltenes, the solution is formed by a pyrolysis process including the steps of heating tires to form pyro-gas, condensing the pyro-gas to form pyro-oil where the pyro oil includes the solution with non-polar hydrocarbons in a non-polar range which is a small percentage of the pyro-oil and with polar hydrocarbons in a polar range that is small.

The Non-Polar analysis (including Non-Polar, Mostly Non-polar and Both categories) appears in the following Non-Polar TABLE 1.

TABLE 1

| Compounds | RT#1 | Resp#1 | Conc#1 | % | Polarity |
|---|---|---|---|---|---|
| Benzoic acid | 14.429 | 70652643 | 208139.9616 | 3.91 | Non-polar[B] |
| 1-Piperidinecarboxaldehyde | 15.681 | 46039135 | 135629.5147 | 2.55 | Non-polar |
| Caprolactam | 15.681 | 45890151 | 135190.6131 | 2.54 | Non-polar[M] |
| Benzoic acid, 4-methyl- | 15.816 | 12668384 | 37320.5693 | 0.70 | Non-polar |
| 3,5-Dithiahexanol 5,5-dioxide | 04.142 | 11874626 | 34982.1914 | 0.66 | Non-polar |
| 3,3'-Bithiophene | 22.133 | 4719804 | 13904.3601 | 0.26 | Non-polar |
| Benzoic acid, 4-cyano- | 18.528 | 3966857 | 11686.2074 | 0.22 | Non-polar |
| Quinoline, 2-methyl- | 16.378 | 2967618 | 8742.4888 | 0.16 | Non-polar |
| Benzonitrile | 10.791 | 1698480 | 5003.6552 | 0.09 | Non-polar |
| Propanoic acid | 04.737 | 1503912 | 4430.4664 | 0.08 | Non-polar[B] |
| Pentanoic acid | 08.803 | 1526156 | 4495.9960 | 0.08 | Non-polar |
| Benzene, 2,4-diisocyanato-1-methyl- | 16.990 | 1341867 | 3953.0876 | 0.07 | Non-polar |
| Benzoic acid, 4-cyano-, methyl ester | 17.074 | 1231125 | 3626.8476 | 0.07 | Non-polar |
| Quinoline, 2,4-dimethyl- | 18.332 | 1192934 | 3514.3368 | 0.07 | Non-polar |
| 2-Cyclopenten-1-one, 2,3-dimethyl- | 11.588 | 850251 | 2504.8055 | 0.05 | Non-polar |
| 4-Ethylbenzoic acid | 17.040 | 921629 | 2715.0836 | 0.05 | Non-polar |
| Phenol, 2-methyl- | 12.093 | 705684 | 2078.9165 | 0.04 | Non-polar[B] |
| p-Cresol | 12.447 | 745904 | 2197.4036 | 0.04 | Non-polar |
| Benzamide | 16.748 | 705244 | 2077.6204 | 0.04 | Non-polar[M] |
| Cyclopentanone | 06.545 | 565885 | 1667.0749 | 0.03 | Non-polar |
| 2-Piperidinone | 14.665 | 482334 | 1420.9364 | 0.03 | Non-polar |
| 1,2-Benzenedicarbonitrile | 15.625 | 560339 | 1650.7363 | 0.03 | Non-polar |
| Isopropyl phenyl ketone | 18.006 | 455830 | 1342.8575 | 0.03 | Non-polar |
| Butylated Hydroxytoluene | 19.202 | 492259 | 1450.1753 | 0.03 | Non-polar |
| Benzamide, N-methyl- | 17.372 | 325493 | 958.8911 | 0.02 | Non-polar |
| Pyridine, 2,5-dimethyl- | 09.813 | 113145 | 333.3202 | 0.01 | Non-polar |
| Acetophenone | 12.335 | 190973 | 562.5988 | 0.01 | Non-polar |
| Benzonitrile, 4-ethenyl- | 15.300 | 119235 | 351.2620 | 0.01 | Non-polar |
| Cyclohexasiloxane, dodecamethyl- | 16.484 | 145295 | 428.0331 | 0.01 | Non-polar |
| 1-Hexen, 2(p-anisyl)-5-methyl- | 17.220 | 157931 | 465.2575 | 0.01 | Non-polar |
| Cycloheptasiloxane, tetradecamethyl- | 18.893 | 110013 | 324.0937 | 0.01 | Non-polar |
| Cyclooctasiloxane, hexadecamethyl- | 21.033 | 160154 | 471.8064 | 0.01 | Non-polar |
| Diphenyl acetylene | 22.656 | 174116 | 512.9393 | 0.01 | Non-polar |
| Cyclononasiloxane, octadecamethyl- | 22.886 | 92565 | 272.6920 | 0.01 | Non-polar |
| | | | TOTAL | 11.94 | |

Non-polar[B] = Also Polar
Non-polar[M] = Mostly Non-Polar

The Polar analysis appears in the following TABLE 2.

TABLE 2

| Compounds | RT#1 | Resp#1 | Conc#1 | % | Polarity |
|---|---|---|---|---|---|
| Acetic acid | 3.227 | 5089161 | 14992.4722 | 0.28 | Polar |
| Phenol | 10.723 | 4417230 | 13012.9891 | 0.24 | Polar |
| Aniline | 10.656 | 2402357 | 7077.2499 | 0.13 | Polar |
| Diphenyl sulfone | 24.205 | 2228537 | 6565.1833 | 0.12 | Polar |
| Benzoic acid, methyl ester | 12.851 | 1442987 | 4250.9838 | 0.08 | Polar |
| Propanoic acid, 2-methyl- | 5.630 | 1007641 | 2968.4788 | 0.06 | Polar |
| Butanoic acid | 6.674 | 1153406 | 3397.8898 | 0.06 | Polar |
| Pyridine | 5.574 | 795184 | 2342.5815 | 0.04 | Polar |
| Decane | 11.032 | 663244 | 1953.8903 | 0.04 | Polar |
| 1,2-Benzisothiazole | 15.081 | 808685 | 2382.3559 | 0.04 | Polar |
| Pyridine, 2-methyl- | 7.264 | 556197 | 1638.5340 | 0.03 | Polar |
| Butanoic acid, 3-methyl- | 7.882 | 588330 | 1733.1969 | 0.03 | Polar |
| Benzyl alcohol, TBDMS derivative | 8.741 | 294378 | 867.2268 | 0.02 | Polar |
| 2,5-Pyrrolidinedione, 1-methyl- | 12.733 | 344595 | 1015.1630 | 0.02 | Polar |
| 2H-Benzimidazol-2-one, 1,3-dihydro-5-methyl- | 17.725 | 278915 | 821.6716 | 0.02 | Polar |
| Butanoic acid, 2-methyl- | 8.078 | 240862 | 709.5688 | 0.01 | Polar |
| benzoic acid, 4-(dimethoxymethyl)-, methyl ester | 8.370 | 257146 | 757.5435 | 0.01 | Polar |

TABLE 2-continued

| Compounds | RT#1 | Resp#1 | Conc#1 | % | Polarity |
|---|---|---|---|---|---|
| Cyclohexanone | 8.898 | 127497 | 375.6008 | 0.01 | Polar |
| 2-Cyclopenten-1-one, 2-methyl- | 9.190 | 206981 | 609.7573 | 0.01 | Polar |
| 2-Cyclopenten-1-one, 3-methyl- | 10.426 | 170331 | 501.7880 | 0.01 | Polar |
| N-Formylmorpholine | 13.368 | 217272 | 640.0746 | 0.01 | Polar |
| Morpholine, 4-acetyl- | 14.530 | 111425 | 328.2545 | 0.01 | Polar |
| 1,3-Benzenedicarboxylic acid, dimethyl ester | 19.023 | 265721 | 782.8038 | 0.01 | Polar |
| 1,4-Benzenedicarboxylic acid, ethyl methyl ester | 20.011 | 74117 | 218.3462 | 0.00 | Polar |
| | | | TOTAL | 1.29% | |

Precipitation of paraffin occurs over a range of 10-15 degrees C. for typical heavy oils until solidification occurs. The Cloud Point is the temperature at which crystals first appear in the oil. This temperature depends on the concentration, molecular weight of the paraffin and the chemical nature of the heavy oil. The Exotherm Area is the energy released at the time of crystallization.

To test the solution, 15.9 microliters of paraffin inhibitor 10 was added to an oil sample size of 10 milliliters, producing a 0.159% mixture. As a baseline, a straight crude oil sample was processed without additives to act as a comparison baseline.

Three oils from three different oil wells, Well A, Well B and Well C, were sampled and used for the test. The inhibitor solution lowered the cloud point temperature in two of the three sample runs. This testing was with only a 0.159% mixture. An increased mixture would improve the performance. The three oil samples showed differing cloud points reinforcing the need for concentration levels of the inhibitor solution high enough to treat varying conditions without having to exactly match the inhibitor percentage to the paraffin content exactly. The results of the tests are shown in TABLE 3.

TABLE 3

| Well | Additive | Cloud Point ° C. | Exo Area J/g |
|---|---|---|---|
| A | NoAdd | 45.94 | 11.92 |
| A | P5 (0.159%) | 40.73 | 15.46 |
| B | NoAdd | 37.13 | 14.47 |
| B | P5 (0.159%) | 35.05 | 12.17 |
| C | NoAdd | 38.41 | 14.00 |
| C | P5 (0.159%) | 39.08 | 16.46 |

Figure 2:
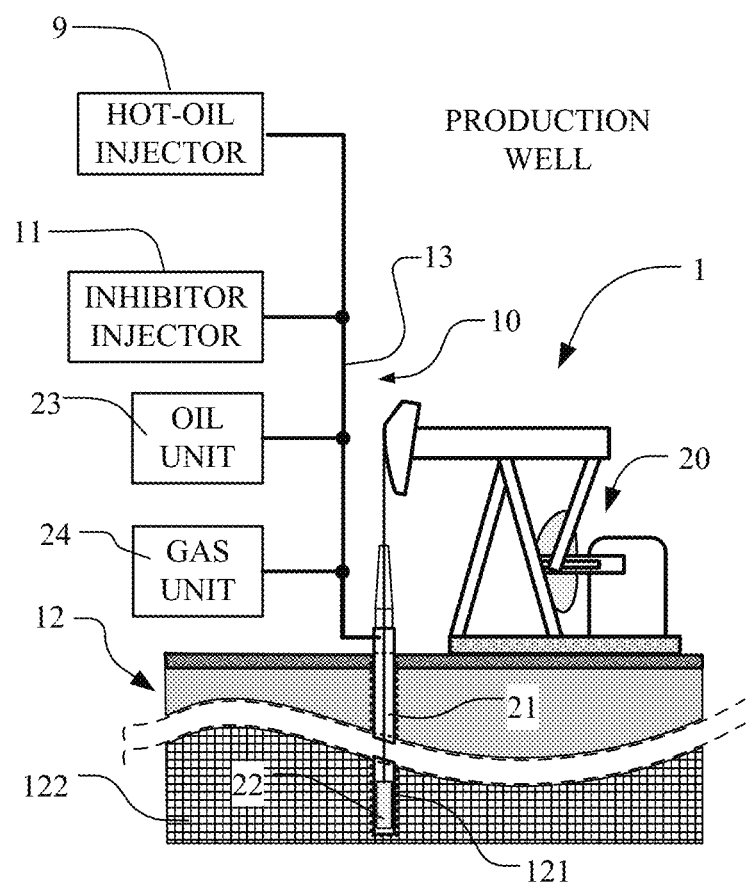
FIG. 2 depicts a production well for pumping crude oil from the ground together with an inhibitor apparatus for injecting an inhibitor into the production well, pump systems, fluid piping and storage tank systems.

In FIG. 2, enhanced oil recovery (EOR) is done in an oil field ground 12. The oil field ground 12 includes a production well 1 including core 21 extending in a well bore 121 down into the crude oil reservoir 122. An inhibitor injector 11 connects to and supplies an injection stream in piping 13 to transport an inhibitor down the core 21. A hot-oil injector 9 connects to and supplies an injection stream in piping 13 to transport hot oil down the core 21. The injection stream in piping 13, from either the hot-oil injector 9 or the inhibitor injector 11, or from both, is forced down the core 21 under substantial pressure.

In FIG. 2, the production well 1 includes a pump 20 connected through the well core 21 to the down-hole pump 22. Oil and gas is pumped from the down-hole pump 22 through the well core 21 for processing and storage in the oil unit 23 and the gas unit 24. An inhibitor injector 11 injects, through piping 13, an inhibitor 10 into the production well 11 or into the oil unit 23 or gas unit 24. The inhibitor increases the flow of ground oil from the ground and through all extraction system components to help withdraw the oil from the ground and improve the flow of the oil throughout the extraction system components.

When the production oil well 1 of FIG. 2 type is impeded by paraffin, an inhibitor solution is mixed with extracted oil for injection into the well 1 for treatment of paraffin. A few percent mix, for example 1%, of the inhibitor solution is mixed with extracted oil for injection into well 1. The inhibitor of TABLE 1 and TABLE 2 is mixed with extracted oil from well 1. A live well test included a 'hot oil' application followed by a maintenance application using the inhibitor 10.

In FIG. 3, the chart reflects the production rate prior to the 56$^{th}$ day. On the 56$^{th}$ day, the well 1 was hot-oiled treated using 100 gallons of inhibitor 10. The production rate immediately increased as shown in AREA 1 when the paraffin restrictions were removed. When the paraffin restrictions were first removed, the pooled oil surrounding the pump was lifted out of well 1 at the high rate shown in AREA 1. When the oil quantity in the pool was decreased, the rate decreased to a continuous elevated flow, as represented by Area 2. After about day 136, the effect of the hot oiling application began to wear off as shown in AREA 3 until about day 190 when the flow returned back to the original rate. The chart of FIG. 3 shows that utilizing a well treatment procedure using inhibitor 10 succeeded in increasing the lift of the well 1.

While hot-oiling provides a remedy for a paraffin impeded well, it is desirable keep a well at higher production rates eliminating or reducing the need for hot-oil treatments. To achieve that goal, a maintenance procedure is employed. As shown in FIG. 4, positive results of higher flow rates occurred after hot-oil treatment of 50 gallons, smaller than the 100 gallon treatment of FIG. 3. The maintenance procedure involved injecting five gallons of inhibitor 10 twice per week. After the hot-oil treatment of day 50, the well 1 was allowed to settle out until the maintenance treatment began on day 140. The spikes in the chart of FIG. 4 showed some days production at an elevated rate with fluctuations of reservoir content causing the up and downs in the graph. Finally, on day 150, the maintenance treatment schedule was stopped to see the effects. There were some increased days of production that settled down by day 185 when the effects of the injected inhibitor 10 wore off. The chart of FIG. 4 shows successful production increases using a hot-oil treatment followed by maintenance treatments to establish a steady-state continuously higher flow rate of extraction for a well using the inhibitor 10. The production is typically measured in barrels per day (bbl/day).

The test of inhibitor 10 in hot oiling of a well were done to see how long the single blast of paraffin inhibitor 10 holds its ability to increase production. The initial production rate of 6.3 barrels per day for 50 days average with a spike as a result of the hot oil treatment using inhibitor 10. This spike is typical of most hot oil treatments, however, what resulted afterwards is of major interest. Most all hot oil treatments will have an immediate effect, however, how long the treatment lasts is more important. The initial treatment wore off in the matter of three weeks and settled in at a new high of 9.6 barrels per day average for almost two months. This well's history has included previous hot-oil treatments utilizing production oil and lasting less than 30 days. The trend line that is most important is that the output after the hot oil treatment wore off continued at a 3.3 barrel per day, or 52.4%, rate higher level with a trend line that was showing a slight increase. Equally as important, was the change in operation that took place. The pumping equipment experienced reduced start-stop activity that contributed to the increased production by reducing the opportunity for the crude oil to remain stationary and adhere to the pipe and equipment surfaces. The reduced electrical power needed for electrical motor start up is also significant. In summary, the whole system ran more efficiently.

Figure 5:
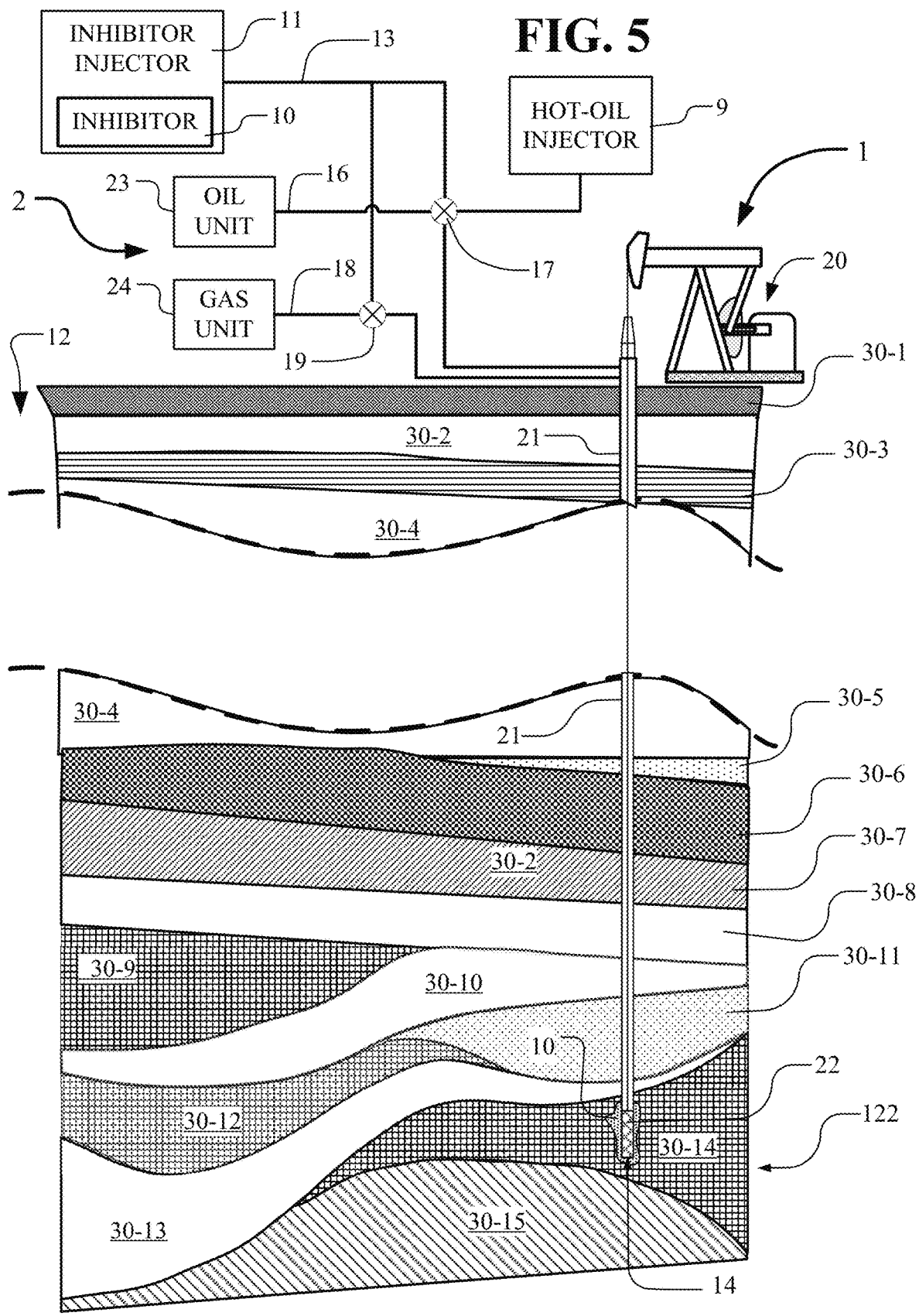
FIG. 5 depicts the above-ground portion and the below-ground portion of a production well of FIG. 2 for pumping crude oil from the ground together with inhibitor apparatus for injecting an inhibitor into the above-ground portion and the below-ground portion of the production well.

In FIG. 5, the above-ground portion and the below-ground portion of the extraction system components 2 of a production well 1 are shown for pumping crude oil from the ground 12. An inhibitor injector 11 is shown for injecting an inhibitor 10 into the extraction system components 2 of production well 1. The extraction system components 2 of production well 1 include a pump 20 connected through the well core 21 to the down-hole pump 22. Oil and gas comes from the down-hole pump 22 through the extraction system components 2 of well core 21 for processing and storage in the oil unit 23 and the gas unit 24 which are part of the extraction system components 2. The inhibitor injector 11 injects, through piping 13, an inhibitor 10 into the extraction system components 2 of production well 1 or into the oil unit 23 or gas unit 24 and pipes 16 and 18 as controlled by valves 17 and 19. The inhibitor 10 pumped down the well core 21 to the down-hole pump 22 extends into the ground region 30-14 and the crude oil reservoir 122 surrounding the well bore pump 22. The inhibitor 10 increases the flow of ground oil from the crude oil reservoir 122 through the extraction system components.

The oil field ground 12 includes a ground formation including a number of layers 30-1, 30-2, . . . , 30-15. These layers, and specifically layers 30-9, 30-12 and 30-14, include ground oil and hence are variously called oil bearing formations or crude oil reservoirs. After primary and secondary recovery has occurred, often the ground oil can no longer be efficiently recovered using those methods owing to changes in temperature, pressure, crystallization or other conditions. To proceed with tertiary recovery, the injection stream of inhibitor 10 from the inhibitor injector 11 is forced into the core 21 and into the down hole-pump 22. The inhibitor 10 typically is forced into layer 30-14 and crude oil reservoir 122 in the region around pump 22. An exit stream of crude oil is withdrawn from the crude oil reservoir 122 of oil-bearing formation 30-14 through core 21 under the force of pump 20.

In FIG. 6, further details of the production well 1 and the injector 119 are shown. The injector 119 combines the inhibitor injector 11 and the hot-oil injector 9 of FIG. 5 which can be separate as shown in FIG. 5 or combined as shown in FIG. 6. The above-ground portion, designated as the pumping and distribution unit 100, and the below-ground portion of a production well 1 are shown for pumping crude oil from the oil field ground 12 and particularly from layer 30-14 holding the crude oil reservoir 122. An injector 119 is shown for injecting an inhibitor 10 into the production well 1. The production well 1 includes a pump 20 connected through the well core 21 to the down-hole pump 22. Oil and gas comes from the down-hole pump 22 through the well core 21 for processing and storage in the oil unit 23 and the gas unit 24. The injector 119 injects, through piping 13, an inhibitor 10 into the production well 1 or into the oil unit 23 or gas unit 24 and pipes 16 and 18 as controlled by valves 17 and 19. The inhibitor 10 pumped down the well core 21 by the injector 119 to the down-hole pump 22 extends into the surrounding ground in the pump region 101 including parts of the layer 30-14 and the crude oil reservoir 122. The inhibitor 10 increases the flow of ground oil from the ground through the extraction system components.

In FIG. 6, the pump 20 includes a prime mover 140 rotating a crank 47 connected to a Pitman arm 45 driving the walking beam 41. The walking beam 41 rotates and drives the horse head 42 up and down. The horse head 42 translates the bridle 63 up and down into the stuffing box 64 and translates the down-hole pump 22 up and down. Oil is pumped up the tube center 52 through the tee 65 into the pipe 28.

In FIG. 6, the core 21 typically includes a cement region 48, a casing 49, an annulus 50, lift tubing 51 and tube center 52. In the embodiment described, the inhibitor 10 is an inhibitor solution in an injection stream and is pumped by the injector 11 into the piping 25, through the valve 19, through the piping 26 to the annulus 50. The inhibitor 10 in the injection stream goes down piping 26 and annulus 50 to the region of the down-hole pump 22. The inhibitor 10 in the injection stream is forced through the openings (perforations) 62 into the pump region 101 within the layer 30-14 around the down-hole pump 22.

The injector 119, the piping 25, the tee 19, the piping 26, annulus 50, the pump 22, the tube center 52 of the lift tubing 51, T-valve 65, the piping 28, the valve 17 and the piping 27 connecting back to the injector 119 form a loop 120 for circulating the injection stream (including the inhibitor 10). The injector 119 through the loop 120 provides a continuous flushing of the injection stream through the loop 120 for solubilizing the paraffin. The continuous flushing acts to clear paraffin from any of the components in the loop and to decrease the viscosity of the crude oil. The continuous flushing functions to increase the production of crude oil in the production well.

Typically, the injector 119 will include a hot-oil truck that is driven to the location of the production well. The hot-oil truck includes pumps, storage tanks and heaters for processing the injection stream. The pumps can apply increased pressure and temperature to the processing of the injection stream. The injection stream is heated in a range from ambient temperature up to 300° C. or more. The pressure of the injection stream is increased sufficient to force the injection stream including inhibitor 10 down to the pump region 101. For example, a normally pressured reservoir, assuming a given area's water gradient of 0.43 psi/ft and a depth of 4000 feet, could be about 1,700 psi. Therefore, the pressure of the injection fluid would need to be increased to greater than 1700 psi to reach the target reservoir. However, the required pressure can differ as a function of the particular production well being treated.

The mixing of the inhibitor solution with the crude oil from the production well is typically done in the inhibitor 110. The mixing in one embodiment has the inhibitor solution 0.15% or greater of the crude oil of the production well and is effective to lower the Cloud Point temperature of the crude oil. In FIG. 7, the up stroke of the bore pump 22 is shown. The traveling valve 53 travels up from the position 53' to the position of traveling valve 53 and causes the ball 55 to seat into the opening 58 preventing any crude oil from passing through the opening 58 while pushing crude oil up the core 21 and particularly up the tubing center 52. The standing valve 54 has the ball 56 open allowing crude oil to enter chamber 61 from the oil-bearing formation 30-14 as the up stroke of the bore pump 22 occurs.

In FIG. 8, the down stroke of the bore pump 22 is shown. The traveling valve 53 travels down from the position 53 to the position of traveling valve 53' and causes the ball 55 to unseat from the opening 58 allowing crude oil upward into the chamber 61 passing through the opening 58 while preventing crude oil from exiting the chamber 61 because the standing valve 54 has the ball 56 closed as the down stroke of the bore pump 22 occurs.

When the conditions for wax formation exist for the oil-bearing formation 30-14, a wax formation may occur anywhere in the crude oil path from openings 62, in the bore pump 22, in the tubing 51, and the tubing 16. In the embodiment of FIG. 6, the inhibitor injector valve 19 is open to permit inhibitor 10 to flow down piping 25 and piping 26 to the annulus 50, through the openings (perforations) 62 and into the oil-bearing formation 30-14 and the bore pump 22. The operation of the bore pump 22 tends to push the crude oil mixed with inhibitor 10 up the tubing center 52. In the embodiment shown in FIG. 6, the valve 17 is open to the oil unit 23 through line 16 and is closed to the 119. In an alternate connection, the valve 17 is open to allow inhibitor 10 to be forced down the piping 27, the piping 28, the tubing center 52 toward the bore pump 22. The valves 17 and 19 are controlled to allow the fluid of inhibitor 10 to be forced down either the annulus 50, the tubing center 52 or both.

At times, crude oil from the oil unit 23 of production well 1 of FIG. 6 is pumped over long-distance pipe lines 29 to a remote oil unit 123. The pipe line 29 can be adversely affected by wax build up, particularly when the pipe lines 29 is in a cold environment. The valve 117 is opened to permit pumping of an inhibitor 10 through pipe 117 into the pipe line 29 and to remote oil unit 123 to help prevention of wax and asphaltenes formation.

A primary parameter for recovery of hydrocarbons from the oil-bearing formation 30-14 is the critical temperature referred to as the "Wax Appearance Temperature" (WAT). The WAT for the oil-bearing formation 30-14 can vary with oil composition, cooling rate, pressure, paraffin concentration, molecular mass of paraffin molecules, occurrence of nucleating materials such as asphaltenes, formation fines, and corrosion products and water/oil ratio. Since the temperature cools as the depth below-ground level decreases, the WAT can be reached anywhere from the region of the bore pump 22 and upward in the tubing 51 or any piping upstream therefrom.

The prevention of wax formation using inhibitors enhances oil flow by improving flow rates. A high flow rate tends to minimize wax adherence to metal surfaces because of the shearing action of the flowing fluid. The metal surfaces in FIG. 6 where wax adherence can occur include the bore pump 22, the tubing 51, the T-valve 65, the piping 28, the valve 17, the piping 16. Additional metal surfaces appear in the oil unit 23, the remote piping 29 and the remote oil unit 123. If the remote piping 29 is in cold climates, the need for inhibitors is increased.

The inhibitor 10 inserted into the oil flow conduits of FIG. 6 includes the non-polar components 14 of FIG. 1 and TABLE 1 and the polar components 15 of FIG. 1 and TABLE 2. The insertion of the inhibitor 10 occurs anywhere over the flow stream of the crude oil.

In FIG. 9, further details of another production well 1 similar to the well of FIG. 6 is shown. The well includes the above-ground portion, designated as the pumping and distribution unit 100, and the below-ground portion of a production well 1 including the pump region 101. The core 48 connects between the pumping and distribution unit 100 to the down-hole pump in the pump region 101 around the pump 22. The core 48 has a bend allowing the pumping region to be offset a substantial lateral amount from directly below the pumping and distribution unit 100. In the example of FIG. 9, the bend is approximately 90° with a typical radius of about 900 feet.

Figure 10:
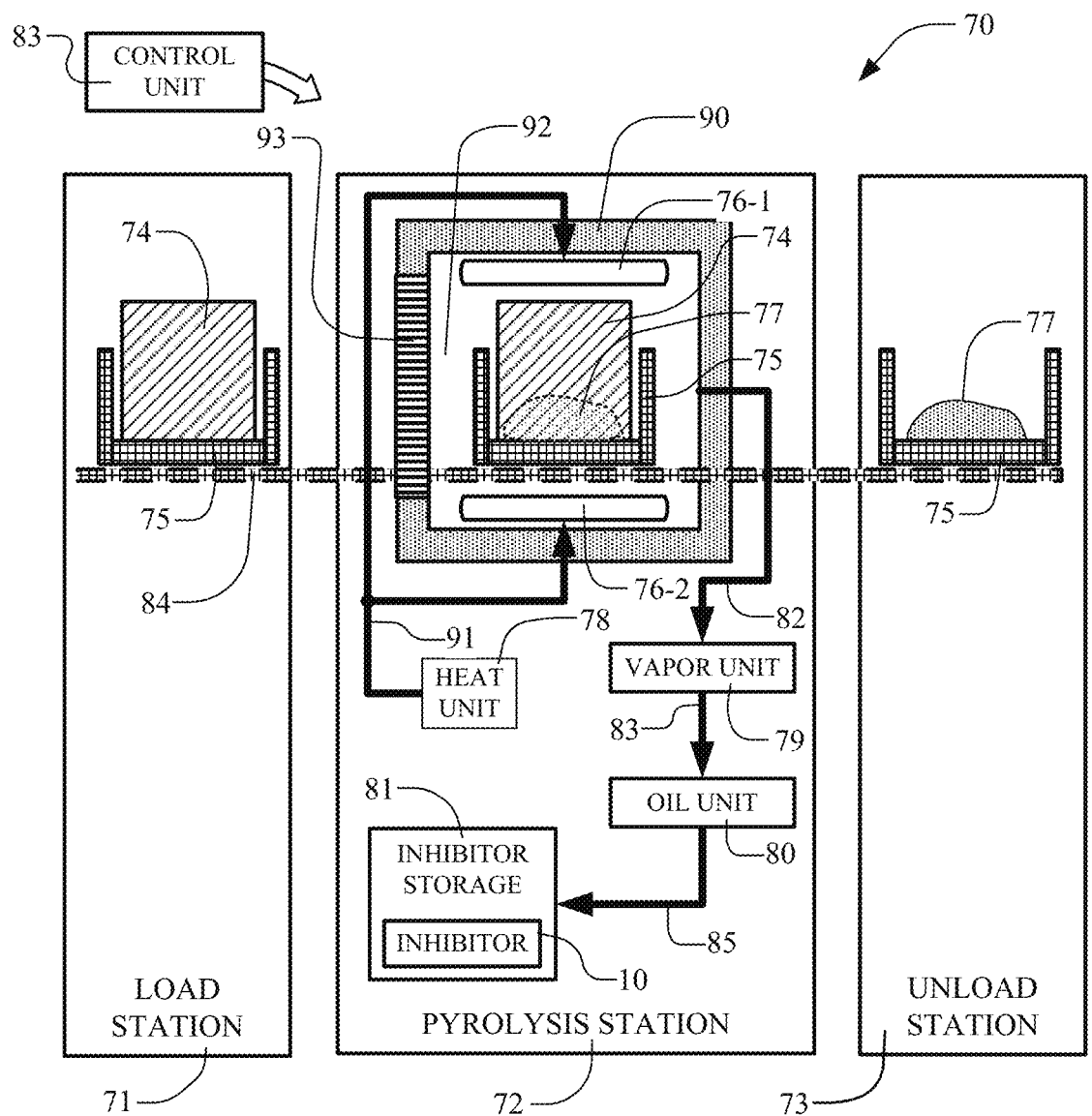
FIG. 10 depicts further details of the pyrolysis system of FIG. 1.

In FIG. 10, a pyrolysis apparatus 70 is shown for producing an inhibitor 10. The pyrolytic system 70 has a load station 71, a pyrolysis station 72, an unload station 73 and a control unit 83. The pyrolysis apparatus 70 includes a transportable cart 75 for moving along a transport track 84 or along other transport paths. The transport track 84 extends to each of the load station 71, the pyrolysis station 72 and the unload station 73. In the load station 71 scrap tires 74 or other materials for pyrolysis are loaded onto transportable cart 75 for transport along the track 84 to the pyrolysis station 72.

The pyrolysis station 72 has a pyrolysis furnace 90 for receiving the transportable cart 75 and the scrap tires 74. The furnace 90 includes a heat unit 78 for heating the furnace 90 to pyrolysis temperatures. The heat unit 78 connects to heaters 76-1 and 76-2 within the furnace 90 where they operate to heat the pyrolysis chamber 92 to the batch pyrolysis temperatures greater than 780° C. and up to 1000° C. or more.

Before the pyrolysis operation, the scrap tires 74 or other materials are on the transportable cart 75. After pyrolysis, the pyro-solids 77 remain on the transportable cart 75 and are transported to the unload station 73. The entry and exit of the transportable cart 75 into and from the chamber 92 of furnace 90 is through a door 93 in the wall of the furnace 93. The door 93 is opened to receive the transportable cart 75 from the load station 71, is closed and sealed during the pyrolysis operation and thereafter is opened to allow transport of the cart 75 and pyro-solids 77 to the unload station 73.

The pyrolysis station 72 includes a vapor unit 79 that connects via the piping 82 (vapor transfer line) to the furnace 90 to receive the vapors resulting from the pyrolysis operation. The vapor unit 79 connects by piping 83 to the oil unit 80. The oil unit 80 connects by piping 82 to the inhibitor storage 81 which stores the inhibitor 10 produced by the pyrolysis operation.

The pyrolytic system 70 receives scrap tires 74 or other material as inputs and performs batch pyrolysis processing to produce pyro-products as outputs. The pyro-products produced include pyro-vapors on piping 82 (vapor transfer line) that are condensed into pyro-oil in the condenser of the vapor unit 79 and pyro-gas that survives the condenser and include pyro-solids 77 that are principally pyro-carbon.

One important example of carbon based polymeric materials for pyrolysis are used tires, typically from automobiles, trucks and other vehicles. The pyrolysis of tires results in, among other things, a carbon residue of pyro-solids (char), pyro-oils and pyro-gases. The composition of pyro-solids, pyro-liquids and pyro-gases is determined by the materials that are used to manufacture tires. The principal tire materials used to manufacture tires include rubber (natural and synthetic), carbon black (to give strength and abrasion resistance), sulfur (to cross-link the rubber molecules in a heating process known as vulcanization), accelerator metal oxides (to speed up vulcanization), activation inorganic oxides (principally zinc oxide, to assist in the manufacture of tires. The tire materials are mixed forming a homogenous "green" tire including carbons and oxides. The "green" tire is transformed into a finished tire by a curing process (vulcanization) where heat and pressure are applied to the "green" tire for a prescribed "cure" time.

When tires are discarded, they are collected for pyrolysis processing to reclaim useful components of the tires where the useful components are the tire materials used to form the "green tires". In general, tire pyrolysis involves the thermal degradation of the tires in the absence of oxygen. Tire pyrolysis is used to convert tires into pyro-materials including pyrolysis gases (pyro-gases), pyrolysis oils (pyro-oils), and pyrolysis solids (pyro-chars) and steel. A by-product of the pyrolysis process is the generation of a substantial amount of heat that can be used for cogeneration or other purposes. To enhance value, pyro-materials can undergo additional processes after the pyrolysis is complete.

The chemical and physical composition of the pyro-gases, pyro-oils, and pyro-chars after pyrolysis differ from the composition of the tires before pyrolysis. Also, the form of the pyro-gases, pyro-oils, and pyro-chars after pyrolysis differ from the solid form of the tires before pyrolysis.

The pyro-gases include processed pyro-gas, combustion gases (such as CO, $CO_2$), helium, nitrogen, and hydrocarbon gasses, sulfur containing hydrocarbon gases, other by-products derived from the pyrolysis process including gases such as vapor-phase metals. The pyro-solids are materials including char that contain a number of inorganic materials, including materials such as metal sulfides and metal oxides and carbon. Solids can be introduced into the injection stream in piping 85 and the solids can include post-processed char that has been externally milled or modified. The liquids include pyro-oil, a number of hydrocarbons and other liquids such as liquids that contain dissolved inorganic metals. The liquids can also include solubilizing agents such as sulfur containing hydrocarbons and other by-products derived from the pyrolysis process.

One of the important products of the pyrolysis process is an inhibitor 10. The inhibitor 10 includes both polar and non-polar compounds which are useful as dissolving agents to help reduce the adverse effects of paraffin.

While the invention has been particularly shown and described with reference to preferred embodiments thereof it will be understood by those skilled in the art that various changes in form and details may be made therein without departing from the scope of the invention.

The invention claimed is:

1. A method of enhanced oil recovery for a crude oil production well, comprising,
   pyrolyzinq rubber materials including the steps of heating the rubber materials to form pyro-vapors, condensing the pyro-vapors to form pyro-gas and pyro-oil where the pyro-oil includes an inhibitor solution including non-polar hydrocarbons and polar hydrocarbons, the rubber materials being scrap tires,
   the non-polar hydrocarbons comprising at least one of benzoic acid; 1-piperidinecarboxaldehyde; caprolactam; benzoic acid, 4-methyl-; and 3,5-dithiahexanol 5,5-dioxide; 3,3'-bithiophene; benzoic acid, 4-cyano-; and quinoline, 2-methyl,
   injecting the inhibitor solution as an injection stream into the crude oil production well to facilitate production of crude oil from the crude oil production well.

2. A method of enhanced oil recovery for a crude oil production well, comprising,
   pyrolyzinq rubber materials including the steps of heating the rubber materials to form pyro-vapors, condensing the pyro-vapors to form pyro-gas and pyro-oil where the pyro-oil includes an inhibitor solution including non-polar hydrocarbons and polar hydrocarbons, the rubber materials being scrap tires,
   the polar hydrocarbons comprising at least one of acetic acid; phenol; aniline; diphenyl sulfone; benzoic acid, methyl ester; propanoic acid, 2-methyl-; butanoic acid; pyridine; decane; 1,2-benzisothiazole, and
   injecting the inhibitor solution as an injection stream into the crude oil production well to facilitate production of crude oil from the crude oil production well.

3. A method of enhanced oil recovery for a crude oil production well, comprising,
   pyrolyzinq rubber materials including the steps of heating the rubber materials to form pyro-vapors, condensing the pyro-vapors to form pyro-gas and pyro-oil where the pyro-oil includes an inhibitor solution including non-polar hydrocarbons and polar hydrocarbons, the rubber materials being scrap tires,
   the properties of the inhibitor solution being approximately specific gravity (60° F.): 0.82, Weight (60° F.): 6.8 lbs/US gal, flash point (SFCC): 74° F., pour point (ASTM D-97): <40° F., viscosity (ASTM D-455) (60° F.): 32, solubility: oil-soluble, ionic character: anionic, pH: 7.5.

4. A method of enhanced oil recovery for a crude oil production well where the well has a core extending into a well bore to a crude oil reservoir and where the well has production impeded by paraffin, comprising,
   pyrolyzinq scrap tires including the steps of heating the scrap tires to greater than 400° C. to form pyro-vapors, condensing the pyro-vapors to form pyro-gas and pyro-oil where the pyro-oil includes an inhibitor solution formed of non-polar hydrocarbons and polar hydrocarbons wherein the non-polar hydrocarbons have a non-polar range of at least 3% of the pyro-oil, and
   injecting the inhibitor solution as an injection stream into the crude oil production well to solubilize the paraffin to increase production of crude oil from the production well, the injection stream including a first injection with a first injection quantity for establishing an increased flow of the crude oil and includes maintenance injections with maintenance injection quantities substantially less than the first injection quantity.

5. A method of enhanced oil recovery for a crude oil production well where the well has a core extending into a well bore to a crude oil reservoir and where the well has production impeded by paraffin, comprising,
   pyrolyzinq scrap tires including the steps of heating the scrap tires to greater than 400° C. to form pyro-vapors, condensing the pyro-vapors to form pyro-gas and pyro-oil where the pyro-oil includes an inhibitor solution formed of non-polar hydrocarbons and polar hydrocarbons wherein the non-polar hydrocarbons have a non-polar range of at least 3% of the pyro-oil, and
   injecting the inhibitor solution as an injection stream into the crude oil production well to solubilize the paraffin to increase production of crude oil from the production well, the injection stream being applied to the production well in maintenance quantities on multiple applications at maintenance intervals over a period of time.

6. A method of enhanced oil recovery for a crude oil production well where the well has a core extending into a well bore to a crude oil reservoir and where the well has production impeded by paraffin, comprising, pyrolyzinq scrap tires including the steps of heating the scrap tires to greater than 400° C. to form pyro-vapors, condensing the pyro-vapors to form pyro-gas and pyro-oil where the pyro-oil includes an inhibitor solution formed of non-polar hydrocarbons and polar hydrocarbons wherein the non-polar hydrocarbons have a non-polar range of at least 3% of the pyro-oil, and injecting the inhibitor solution as an injection stream into the crude oil production well to solubilize the paraffin to increase production of crude oil from the production well, the injection stream being applied to storage tanks.

7. A method of enhanced oil recovery of crude oil from a crude oil production well having an injector, piping, a core including an annulus, a pump and lift tubing where the core extends into a well bore to a crude oil reservoir for pumping crude oil having a viscosity increased by paraffin components, comprising, pyrolyzing scrap tires including the steps of heating the scrap tires in a temperature range from 400° C. to 850° C. over a period from 3 hours to 5 hours to form pyro-vapors, condensing the pyro-vapors to form pyro-gas and pyro-oil where the pyro-oil includes an inhibitor solution formed of non-polar hydrocarbons and polar hydrocarbons, mixing the inhibitor solution with the crude oil of the production well in a percentage greater than 0.15% to form an injection stream for lowering a cloud point temperature of the crude oil of the production well, injecting the injection stream into a loop including the injector, the piping, the annulus, the pump and the lift tubing, and providing a continuous flushing of the injection stream in the loop for solubilizing the paraffin to decrease the viscosity of the crude oil.

8. The method of claim 7 wherein the injection stream propagates into the oil reservoir.

9. The method of claim 7 wherein the injection stream is applied to the production well at elevated temperatures.

10. The method of claim 7 wherein the injection stream is applied to the production well at elevated pressures.

* * * * *